United States Patent
Wang et al.

(10) Patent No.: US 8,138,722 B2
(45) Date of Patent: Mar. 20, 2012

(54) ACTIVATING AN INFORMATION HANDLING SYSTEM BATTERY FROM A SHIP MODE

(75) Inventors: Ligong Wang, Round Rock, TX (US); David Toland, Round Rock, TX (US); Fu Sheng Tsai, Northborough, MA (US)

(73) Assignee: Dell Products L.P., Round Rock, TX (US)

( * ) Notice: Subject to any disclaimer, the term of this patent is extended or adjusted under 35 U.S.C. 154(b) by 778 days.

(21) Appl. No.: 12/253,829

(22) Filed: Oct. 17, 2008

(65) Prior Publication Data
US 2010/0097118 A1 Apr. 22, 2010

(51) Int. Cl.
*H02J 7/00* (2006.01)
(52) U.S. Cl. .................................. 320/135; 307/140
(58) Field of Classification Search .................... 320/135
See application file for complete search history.

(56) References Cited

U.S. PATENT DOCUMENTS

| | | | |
|---|---|---|---|
| 4,709,355 A | 11/1987 | Woods et al. | 367/16 |
| 4,897,662 A | 1/1990 | Lee et al. | 343/701 |
| 5,339,296 A | 8/1994 | Davis | 368/67 |
| 5,448,110 A | 9/1995 | Tuttle et al. | 257/723 |
| 5,619,076 A * | 4/1997 | Layden et al. | 307/48 |
| 5,774,876 A | 6/1998 | Woolley et al. | 705/28 |
| 5,804,810 A | 9/1998 | Woolley et al. | 235/492 |
| 5,892,441 A | 4/1999 | Woolley et al. | 340/539 |
| 5,909,152 A | 6/1999 | Li et al. | 331/116 FE |
| 5,955,869 A | 9/1999 | Rathmann | 320/132 |
| 6,087,737 A * | 7/2000 | Alksnat et al. | 307/10.7 |
| 6,243,007 B1 | 6/2001 | McLaughlin et al. | 340/447 |
| 6,271,605 B1 * | 8/2001 | Carkner et al. | 307/125 |
| 6,480,104 B1 | 11/2002 | Wall et al. | 340/431 |
| 6,745,027 B2 | 6/2004 | Twitchell, Jr. | 455/422.1 |
| 6,934,540 B2 | 8/2005 | Twitchell, Jr. | 455/422.1 |
| 6,972,677 B2 | 12/2005 | Coulthard | 340/531 |
| 6,980,106 B2 | 12/2005 | Sutphin | 340/539.26 |
| 7,026,790 B2 * | 4/2006 | Kim et al. | 320/112 |
| 7,072,668 B2 | 7/2006 | Chou | 455/456.1 |
| 7,072,697 B2 | 7/2006 | Lappeteläinen et al. | 455/574 |
| 7,082,344 B2 | 7/2006 | Ghaffari | 700/115 |
| 7,119,459 B2 * | 10/2006 | Bruwer et al. | 307/140 |
| 7,133,704 B2 | 11/2006 | Twitchell, Jr. | 455/574 |
| 7,155,264 B2 | 12/2006 | Twitchell, Jr. | 455/574 |
| 7,196,661 B2 | 3/2007 | Harvey | 342/357.15 |
| 7,200,132 B2 | 4/2007 | Twitchell, Jr. | 370/338 |
| 7,209,468 B2 | 4/2007 | Twitchell, Jr. | 370/338 |
| 7,209,771 B2 | 4/2007 | Twitchell, Jr. | 455/574 |
| 7,221,668 B2 | 5/2007 | Twitchell, Jr. | 370/338 |
| 7,333,015 B2 | 2/2008 | Ekström | 340/545.6 |
| 7,394,350 B2 | 7/2008 | Yoshida et al. | 340/426.11 |

(Continued)

*Primary Examiner* — Ramy Ramadan
(74) *Attorney, Agent, or Firm* — Baker Botts L.L.P.

(57) ABSTRACT

In some embodiments, a method for activating an information handling system battery without using AC power is provided. One or more switches associated with a battery are maintained in a ship mode state during shipping of the information handling system such that the battery remains disconnected from particular information handling system components during shipping. In response to a user input, a power-on device generates and communicates a power-on signal to a battery management unit (BMU) of the battery. In response to receiving the power-on signal, the BMU activates the one or more switches from the ship mode state, which connects the battery to the particular information handling system components. The power-on device generates and communicates the power-on signal to the BMU, and the BMU activates the one or more switches from the ship mode state, while the information handling system is not connected to any AC power source.

18 Claims, 2 Drawing Sheets

U.S. PATENT DOCUMENTS

| | | |
|---|---|---|
| 7,430,437 B2 | 9/2008 | Twitchell, Jr. ............... 455/522 |
| 2003/0112124 A1 | 6/2003 | Gumundsson ............... 340/7.38 |
| 2004/0100379 A1 | 5/2004 | Boman et al. ............ 340/539.26 |
| 2005/0099156 A1* | 5/2005 | Brenner ........................ 320/116 |
| 2005/0232747 A1 | 10/2005 | Brackmann et al. .......... 414/803 |
| 2005/0283438 A1 | 12/2005 | Brownewell et al. ........... 705/50 |
| 2006/0022637 A1 | 2/2006 | Wang et al. ................... 320/112 |
| 2006/0023679 A1 | 2/2006 | Twitchell, Jr. ................ 370/338 |
| 2006/0273886 A1 | 12/2006 | Yamamoto et al. ...... 340/426.36 |
| 2007/0159999 A1 | 7/2007 | Twitchell, Jr. ................ 370/328 |
| 2007/0291690 A1 | 12/2007 | Twitchell, Jr. ................ 370/328 |
| 2007/0291724 A1 | 12/2007 | Twitchell, Jr. ................ 370/338 |
| 2008/0030345 A1 | 2/2008 | Austin et al. ................ 340/572.8 |
| 2008/0061964 A1 | 3/2008 | Yoshida et al. .......... 340/539.19 |
| 2008/0129458 A1 | 6/2008 | Twitchell ..................... 340/10.1 |
| 2008/0130536 A1 | 6/2008 | Twitchell ..................... 370/310 |
| 2008/0142592 A1 | 6/2008 | Twitchell ..................... 235/439 |
| 2008/0143483 A1 | 6/2008 | Twitchell ..................... 340/10.1 |
| 2008/0143484 A1 | 6/2008 | Twitchell ..................... 340/10.1 |
| 2008/0143523 A1 | 6/2008 | Ekstrom ..................... 340/545.6 |
| 2008/0144554 A1 | 6/2008 | Twitchell ..................... 370/310 |

* cited by examiner

ACTIVATING AN INFORMATION HANDLING SYSTEM BATTERY FROM A SHIP MODE

TECHNICAL FIELD

The present disclosure relates to information handling systems, and more particularly, systems and methods for activating an information handling system battery from a ship mode.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as, but not limited to, financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often include one or more power supply systems configured to provide power to the component(s) of information handling systems. The power supply systems may often employ batteries that (1) may provide backup power to the component(s) of the information handling during a system power outage; and/or (2) may provide temporary power to the component(s) of information handling system when no AC source is available (e.g., at the initial start-up of information handling system, using a portable information handling system not connected to a AC source, etc.).

However, batteries can often be an unreliable source of power. Generally, regardless of whether or not a battery is in use, a certain amount of leakage current is experienced, leaving the battery at less than maximum capacity.

SUMMARY

In accordance with certain embodiments of the present disclosure, an information handling system is provided. The information handling system may include a processor, a memory communicatively coupled to the processor, and a power supply system configured to supply power to one or more particular components of the information handling system. The power supply system includes a battery, one or more switches maintained in a ship mode state during shipping of the information handling system such that the battery remains disconnected from the one or more particular components, a battery management unit (BMU) configured to control the one or more switches, and a power-on device operatively coupled to the BMU and configured to generate and communicate a power-on signal to the BMU. The BMU may be configured to activate the one or more switches from the ship mode state in response to receiving the power-on signal, which connects the battery to the one or more particular components. The power-on device generates and communicates the power-on signal to the BMU, and the BMU activates the one or more switches from the ship mode state, while the information handling system is not connected to any AC power source.

In certain embodiments, a power supply system for an information handling system is provided. The power supply system includes a battery, one or more switches maintained in a ship mode state during shipping of the information handling system such that the battery remains disconnected from the one or more particular components, a battery management unit (BMU) configured to control the one or more switches, and a power-on device operatively coupled to the BMU and configured to generate and communicate a power-on signal to the BMU. The BMU may be configured to activate the one or more switches from the ship mode state in response to receiving the power-on signal, which connects the battery to the one or more particular components. The power-on device generates and communicates the power-on signal to the BMU, and the BMU activates the one or more switches from the ship mode state, while the information handling system is not connected to any AC power source.

In some embodiments, a method for activating an information handling system battery without using AC power is provided. One or more switches associated with a battery are maintained in a ship mode state during shipping of the information handling system such that the battery remains disconnected from particular information handling system components during shipping. In response to a user input, a power-on device generates and communicates a power-on signal to a battery management unit (BMU) of the battery. In response to receiving the power-on signal, the BMU activates the one or more switches from the ship mode state, which connects the battery to the particular information handling system components. The power-on device generates and communicates the power-on signal to the BMU, and the BMU activates the one or more switches from the ship mode state, while the information handling system is not connected to any AC power source.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
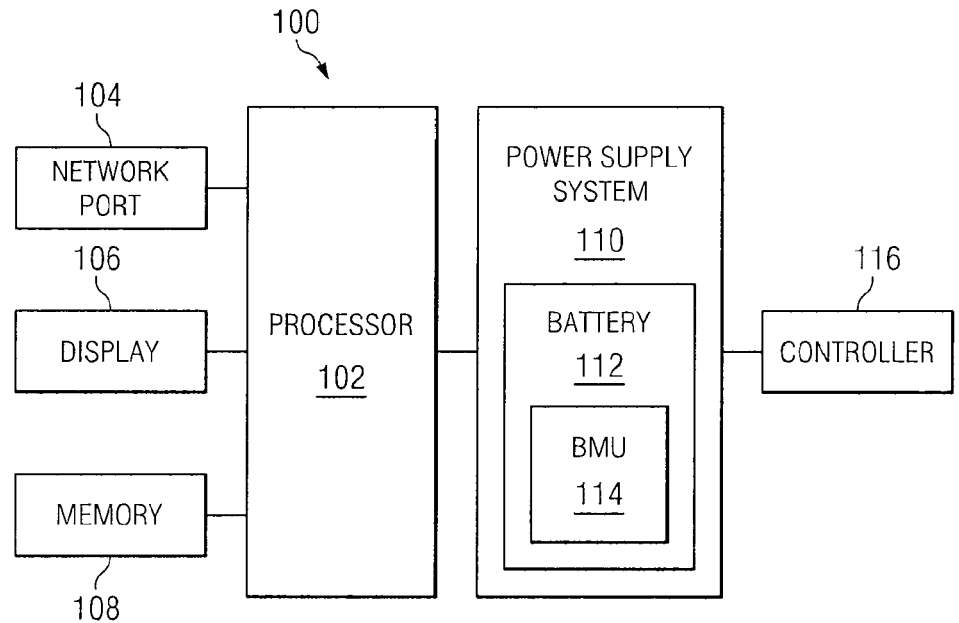
FIG. 1 illustrates a block diagram of an example information handling system including a system for waking a battery from ship mode without using AC power, in accordance with certain embodiments of the present disclosure.
Figure 2:
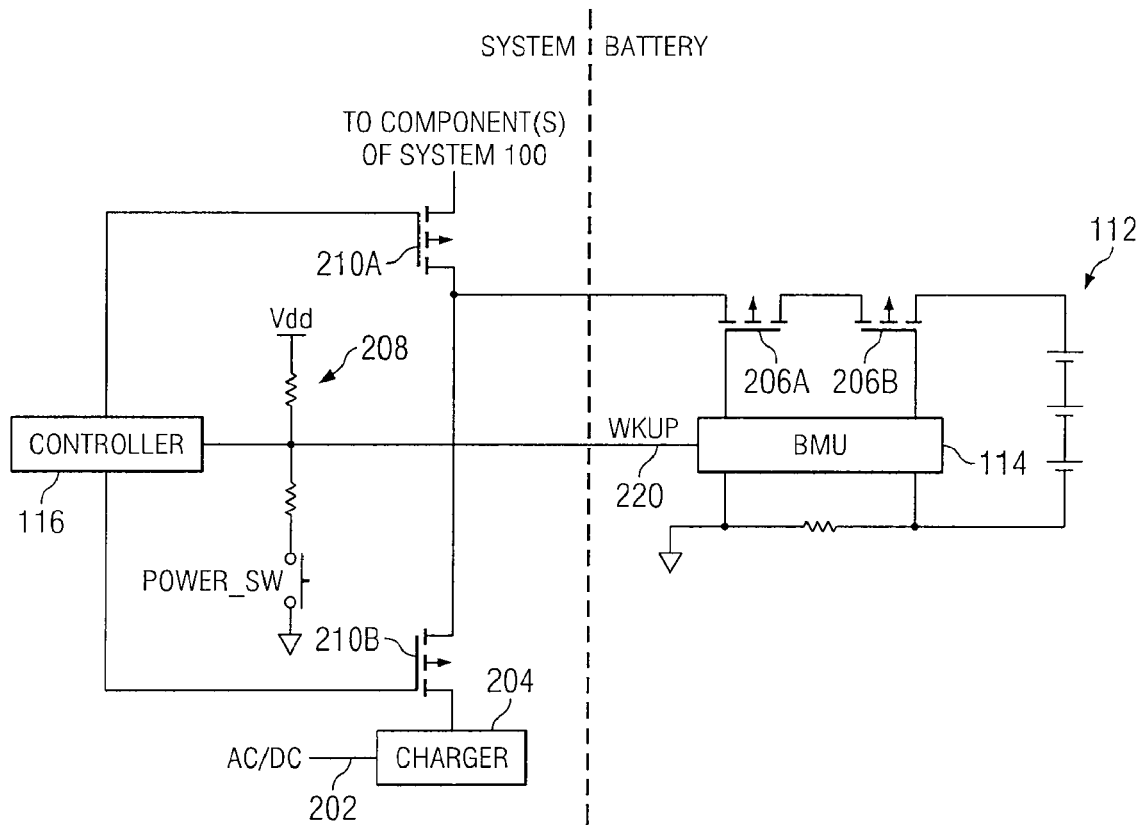
FIG. 2 illustrates an example controller and power supply system of the information handling system of FIG. 1, in accordance with certain embodiments of the present disclosure.
Figure 3:
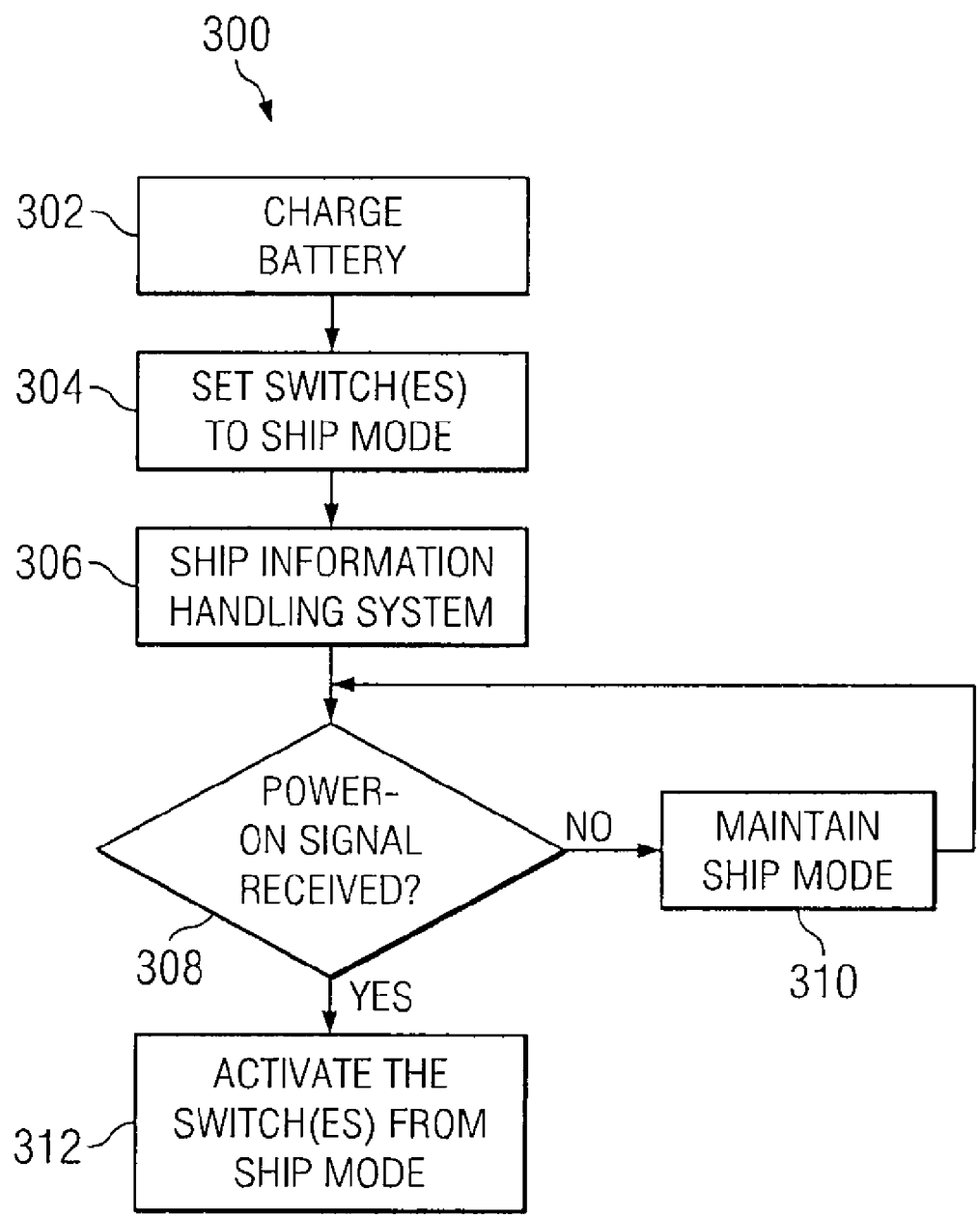
FIG. 3 illustrates a flow chart of an example method for waking a battery from ship mode without using AC power, in accordance with certain embodiments of the present disclosure.

Preferred embodiments and their advantages are best understood by reference to FIGS. 1 through 3, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and/or a video display. The information handling system may also include one or more buses operable to transmit communications between the various hardware components.

FIG. 1 illustrates a block diagram of an example information handling system 100 including a system for waking a battery from ship mode without using AC power, in accordance with certain embodiments of the present disclosure. As shown in FIG. 1, information handling system 100 may include a processor 102, a network port 104, a display 106, memory 108, one or more power supplies 110, a battery 112, a battery management unit (BMU) 114, and a controller 116.

Processor 102 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 104, storage device 110, and/or another component of information handling system 100 and may output results, graphical user interfaces (GUIs), websites, and the like via display 106 or over network port 104.

Network port 104 may be any suitable system, apparatus, or device operable to serve as an interface between information handling system 100 and a network. Network port 104 may enable information handling system 100 to communicate over a network using any suitable transmission protocol and/or standard, including without limitation all transmission protocols and/or standards known in the art.

Display 106 may comprise any display device suitable for creating graphic images and/or alphanumeric characters recognizable to a user, and may include, for example, a liquid crystal display (LCD) or a cathode ray tube (CRT).

Memory 108 may be coupled to processor 102 and may comprise any system, device, or apparatus operable to retain program instructions or data for a period of time. Memory 104 may comprise random access memory (RAM), electrically erasable programmable read-only memory (EEPROM), a PCMCIA card, flash memory, or any suitable selection and/or array of volatile or non-volatile memory that retains data after power to information handling system 100 is turned off.

One or more power supply systems 110 may include any device, system, or apparatus operable to supply power or electrical energy to one or more components of information handling system 100. For example, power supply system(s) 110 may include any system, device, and/or apparatus operable to supply direct current (DC) electrical power to one or more components of information handling system 100. In some embodiments, a DC power supply unit may comprise one or more battery 112. In the same or alternative embodiments, a DC power supply unit may comprise an AC/DC adapter that may convert 110/120- or 220/240-volt (or any other suitable voltage) alternating current supplied by a utility company to a regulated lower voltage DC power supply unit. In addition, an AC/DC adapter may also charge battery 112 while supplying power to information handling system 100.

In addition, power supply system(s) 110 may include any system, device, and/or apparatus operable to supply AC electrical power directly to one or more components of an information handling system. In some embodiments, the AC power supply unit may subsequently be converted into a DC power supply unit (e.g., using an AC/DC converter).

In some embodiments, power supply system(s) 110 may include an uninterruptible power supply unit or a switch mode power supply unit. In other embodiments, power supply system 110 may be assembled in a redundant configuration (e.g., one or more power supply unit may be configured to share a load current such that failure of a single power supply unit may not substantially affect the load current) within, for example, a chassis that may be coupled to information handling system 100. Alternatively, power supply system 110 may include an array of power supply unit, e.g., an array of programmable DC power sources. Details of power supply system(s) 110 are described below with respect to FIG. 2.

Battery 112, which may be an integral unit of power supply system 110, may be any rechargeable system, device, or apparatus operable to retain a charge for a period of time. In one embodiment, battery 112 may be a smart battery with 4 cell series, 3 cell series, or other suitable battery configuration operable to deliver power to component(s) of information handling system 100.

In some embodiments, battery 112 may be a rechargeable battery that may include, for example, a lead and sulfuric acid battery, nickel cadmium (NiCd) battery, nickel metal hydride (NiMH) battery, lithium ion (Li-ion) battery, lithium ion polymer (Li-ion polymer) battery, or any combination of the foregoing. In operation, battery 112 may provide electrical energy to one or more electronic components of information handling system 112. In addition, battery 112 may be recharged by charger 204, described below with respect to FIG. 2.

Battery management unit (BMU) 114 may be coupled to battery 112 and may include any hardware, software, and/or firmware configured to control battery 112. In some embodiments, BMU 114 may control the charging and discharging of battery 112 by controlling one or more switches, e.g., switches 206 of power supply system(s) 110 shown in FIG. 2.

Controller 116 may be communicatively coupled to power supply system 110 and may include any hardware, software, and/or firmware configured to control the flow of power from power supply system(s) 110 to components of information handling system 100. In some embodiments, controller 116 may control the flow of power from battery 112 to components of information handling system 100 by controlling one or more switches, e.g., switches 210 of power supply system(s) 110 shown in FIG. 2. In some embodiments, controller 116 may be a keyboard controller and/or an embedded controller configured to deliver power via management bus (e.g., system management bus SMBus), conducting lines, vias, and/or other suitable paths to information handling system 100. The communication interactions between controller 116 and a power supply system 110 are described below in more detail with respect to FIG. 2.

In operation, prior to shipping information handling system 100 to a user, BMU 114 and/or controller 116 may be configured to control the charging of battery 112 to partial or substantially full capacity. BMU 114 and/or controller 116 may then place the battery 112 in a "ship mode" (e.g., by controlling one or more switches 206) such that the battery 112 is not electrically connected to components of information handling system 100, thus preventing leakage current from battery 112 to such components.

When the user receives the shipped information handling system 100, the user may power up the information handling system 100 "right out of the box" using the battery 112, without having to plug information handling system 100 into a wall outlet and/or wait for battery 112 to charge before using. To achieve such functionality, a wake-up signal may be communicated from a power-up device (e.g., a power button) to the BMU 114, which in turn activates the battery 112 from the ship mode to an active mode (e.g., by controlling one or more switches 206), such that battery 112 is electrically connected to components of information handling system 100. Further details are provided below with respect to FIG. 2.

FIG. 2 illustrates an example of controller 116 and a power supply system 110 for waking a battery 112 from a ship mode without using AC power, in accordance with certain embodiments of the present disclosure. Power supply system 110 may include battery 112 (including BMU 114), an AC-DC power source 202, a charger 204, one or more switches 206 controlled by BMU 114, one or more switches 210 controlled by controller 116, and a power-on device 208.

AC-DC power source 202 may be configured to receive an alternating current (AC) power input (e.g., from a wall outlet) and may convert the AC power input (e.g., 120 Volts, 220 volts, etc.) into a direct current (DC) power, which may be used to power component(s) of information handling system 100.

Charger 204 may include any system, device or apparatus configured to receive a charge signal (e.g., from BMU 114 and/or controller 116) to charge battery 112 and may supply electrical current from AC-DC source 202 to battery 112. In operation, charger 204 may receive a reference voltage $V_{REF}$ (e.g., from BMU 114) indicative of the voltage of battery 112. Charger 204 may determine whether $V_{REF}$ exceeds a threshold voltage, indicating that battery 114 is sufficiently charged, or does not exceed the threshold voltage, indicating that battery 112 is not sufficiently charged. If $V_{REF}$ does not exceed the threshold voltage, charger 204 may provide an electrical current to charge battery 112. The threshold voltage may be any suitable predefined voltage, which may be set automatically by the information handling system 100 and/or selected manually by a user.

One or more switches 206 may include any systems, devices, or apparatuses, controlled by BMU 114, and configured to make or break an electrical circuit based on a voltage driven at its input. For example, in the embodiment shown in FIG. 2, switches 206A and 206B may provide an electrical circuit between battery 112 and components of information handling system 100. In one embodiment, switches 206A and 206B may be field effect transistors (FETs), although other switching elements (e.g., bipolar junction transistors (BJTs)) may be used.

For example, if switches 206 receive a high voltage (logic 1 for an N-channel FET) from BMU 114, such switches 206 may make or complete an electrical circuit between battery 112 and component(s) of information handling system 100, thus providing energy stored in battery 112 to information handling system 100. Otherwise, if one or more switches 206 receive a low voltage (logic 0 for an N-channel FET) driven on its input, such switch(es) 206 may turn off an electrical circuit, for example, between battery 112 and component(s) of information handling system 100.

One or more switches 210 may include any systems, devices, or apparatuses, controlled by controller, and configured to make or break an electrical circuit based on a voltage driven at its input. For example, in the embodiment shown in FIG. 2, switch 210A may provide an electrical circuit between controller 116, battery 112, and/or components of information handling system 100. Similarly, switch 210B may provide an electrical circuit between charge 204 and battery 112 and may be used during the charging of battery 112. In one embodiment, switches 210A and 210B may be field effect transistors (FETs), although other switching elements (e.g., bipolar junction transistors (BJTs)) may be used.

In operation, after manufacturing but prior to shipping information handling system 100 to a user, charger 204 may charge battery 112. In one embodiment, BMU 114 may enable (e.g., close) switches 206A and/or 206B to connect battery 112 to charger 204 such that charger 204 can charge battery 112. Once battery 112 is charged (e.g., $V_{REF}$ of battery 112 exceeds a threshold voltage), BMU 114 may disable (e.g., open) switches 206A and/or 206B to disconnect battery 112 from charger 204. By disabling switch 206A and/or 206B, battery 112 may effectively disconnected from information handling system 100, which may prevent leakage current from battery 112 to components of system 100. This state of switch 206A and/or 206B may be referred to as a "ship mode state," as the information handling system 100 may be stored and/or shipped without battery 112 losing charge.

After the information handling system 100 is shipped to a user, the user may power on system 100 by pressing a power-on device 208 (e.g., a manual power button or other user interface), without connecting information handling system 100 to any AC power source. The pressing of power-on device 208 may generate and communicated a wakeup (WKUP) signal to BMU 114 and/or controller 116. System 110 may include a signal path 220 between power-on device 208 and BMU 114 for communicating the wakeup signal from power-on device 208 to BMU 114. In some embodiments, signal path 220 may pass through a pin of battery 112. For example, signal path 220 could be leveraged on an alarm pin defined by the battery specification (e.g., Pin7Alarm pin defined in DELL's battery spec).

In response to receiving the wakeup signal, BMU 114 and/or controller 116 may enable (e.g., close) switches 206 and/or 210 in order to awaken battery 112 by electrically connecting battery 112 with components of information handling system 100, such that battery 112 can deliver power to such components. In particular, BMU may enable (e.g., close) 206A and/or 206B, and/or controller 116 may enable (e.g., close) switches 210A and/or 210B. In some embodiments in which signal path 220 flows through a pin of battery 112, after battery 112 is awakened the pin may be released for other functions (e.g., an alarm function).

Enabling (e.g., closing) 206A and/or 206B in response to the wakeup signal may be referred to as activating such switch(es) from the ship mode. Power-on device 208, BMU 114, and/or controller 116 may cooperate in this manner to awaken battery 112 and information handling system 100 without information handling system 100 being connected to any AC power supply.

FIG. 3 illustrates a flow chart of an example method 300 for powering information handling system 100 without the need for AC power, in accordance with certain embodiments of the present disclosure. At step 302, prior to shipping information handling system 100 to a user, BMU 114 and/or controller 116 may provide a signal to one or more switches 206 and/or 210 to enable battery 112 to be charged by charger 204. Charger 204 may apply an electrical current to battery 112 and may charge battery 112 to a predetermined (e.g., partially or substantially full) capacity, e.g., until $V_{REF}$ of battery 112 exceeds a predefined threshold.

At step 304, BMU 114 may disable one or more switches 206 to put such switch(es) into a ship mode state. In one embodiment, BMU 114 may apply a low voltage (logic 0 for an N-FET) to one or more switches 206 thereby disabling any electrical connection between battery 112 and information handling system 100, and allowing battery 112 to retain its charge over time.

At step 306, information handling system 100 may be shipped to a user.

At step 308, BMU 114 may wait for a wake-up signal (e.g., from power-up device 208). As long as a wake-up signal is not received, battery 112 may be maintained in ship mode, as indicated at step 310.

A wake-up signal may be generated by a user activating power-on device 208 and/or other components of information handling system 100 when information handling system 100 is not connected to any AC power source. For example, where power-on device 208 comprises a power button, when a user presses the power button, power-on device 208 may generate and communicate a wake-up signal to BMU 114 and/or controller 116. The wake-up signal may be communicated to BMU 114 via a signal path 220, which may include a pin of battery 112.

At step 312, in response to receiving the wakeup signal, BMU 114 and/or controller 116 may activate switches 206 and/or 210 in order to awaken battery 112 by electrically connecting battery 112 with components of information handling system 100, such that battery 112 can deliver power to such components. In particular, BMU may enable (e.g., close) 206A and/or 206B, and/or controller 116 may enable (e.g., close) switches 210A and/or 210B. In some embodiments in which signal path 220 flows through a pin of battery 112, after battery 112 is awakened the pin may be released for other functions (e.g., an alarm function).

Although the present disclosure has been described in detail, it should be understood that various changes, substitutions, and alterations can be made hereto without departing from the spirit and the scope of the invention as defined by the appended claims.

What is claimed is:

1. An information handling system, comprising:
   a processor;
   a memory communicatively coupled to the processor; and
   a power supply system configured to supply power to one or more particular components of the information handling system, the power supply system comprising:
   a battery;
   one or more switches maintained in a ship mode state during shipping of the information handling system, wherein the ship mode state of the one or more switches decouple the battery from the one or more particular components;
   a battery management unit (BMU) configured to control the one or more switches; and
   a power-on device operatively coupled to the BMU and configured to generate and communicate a power-on signal to the BMU in response to a user activation of a power button; and
   the BMU further configured to activate the one or more switches from the ship mode state in response to receiving the power-on signal, wherein activating the one or more switches from the ship mode state couples the battery to the one or more particular components;
   wherein the power-on device generates and communicates the power-on signal to the BMU, and the BMU activates the one or more switches from the ship mode state, while the information handling system is not coupled to any power source other than the battery;
   wherein the power-on device is operatively coupled to the BMU via a pin of the battery.

2. The information handling system of claim 1, wherein the BMU is operably configured to switch the one or more switches to the ship mode state after the battery is charged and prior to shipment of the information handling system.

3. The information handling system of claim 1, wherein the one or more switches are located in the battery.

4. The information handling system of claim 1, wherein the one or more switches comprise one or more transistors.

5. The information handling system of claim 4, wherein the one or more transistors comprise one or more field effect transistors.

6. The information handling system of claim 1, wherein the battery comprises a smart battery.

7. A power supply system for an information handling system, the power supply system comprising:
   a battery;
   one or more switches maintained in a ship mode state during shipping of the information handling system, wherein the ship mode state of the one or more switches decouple the battery from the one or more particular components;
   a battery management unit (BMU) configured to control the one or more switches; and
   a power-on device operatively coupled to the BMU and configured to generate and communicate a power-on signal to the BMU; and
   the BMU further configured to activate the one or more switches from the ship mode state in response to receiving the power-on signal, the power-on signal generated in response to a user activation of a power button, wherein activating the one or more switches from the ship mode state couples the battery to the one or more particular components;
   wherein the power-on device generates and communicates the power-on signal to the BMU, and the BMU activates the one or more switches from the ship mode state, while the information handling system is not coupled to any power source other than the battery;
   wherein the power-on device is operatively coupled to the BMU via a pin of the battery.

8. The system of claim 7, wherein the BMU is operably configured to switch the one or more switches to the ship mode state after the battery is charged and prior to shipment of the information handling system.

9. The system of claim 7, wherein the one or more switches are located in the battery.

10. The system of claim 7, wherein the one or more switches comprise one or more transistors.

11. The information handling system of claim 10, wherein the one or more transistors comprise one or more field effect transistors.

12. The system of claim 7, wherein the battery comprises a smart battery.

13. A method for activating a battery of an information handling system without using AC power, the method comprising:

maintaining one or more switches associated with a battery in a ship mode state during shipping of the information handling system, wherein the ship mode state of the one or more switches decouple the battery from one or more particular information handling system components;

in response to a user activation of a power button, a power-on device generating and communicating a power-on signal to a battery management unit (BMU) of the battery; and the BMU activating the one or more switches from the ship mode state in response to receiving the power-on signal, wherein activating the one or more switches from the ship mode state couples the battery to the one or more particular information handling system components;

wherein the power-on device generates and communicates the power-on signal to the BMU, and the BMU activates the one or more switches from the ship mode state, while the information handling system is not coupled to any power source other than the battery;

wherein the power-on device is operatively coupled to the BMU via a pin of the battery.

14. The method of claim 13, further comprising:
maintaining the one or more switches in a charge state during charging of the battery prior to shipment of the information handling system; and
switching, by the BMU, the one or more switches from the charge state to the ship mode state after the battery is charged and prior to shipment of the information handling system.

15. The method of claim 13, further comprising:
releasing the pin for other functions after the BMU receives the power-on signal from the power-on device.

16. The method of claim 13, wherein the one or more switches comprise one or more transistors.

17. The method of claim 13, wherein the one or more switches are located in the battery.

18. The method of claim 13, further comprising charging the battery prior to maintaining one or more switches associated with a battery in a ship mode state.

\* \* \* \* \*